US005501110A

United States Patent [19]

Peilloud et al.

[11] Patent Number: 5,501,110
[45] Date of Patent: Mar. 26, 1996

[54] TORSION MEASURING DEVICE FOR A ROTATING SHAFT

[75] Inventors: Fernand Peilloud, Hery sur Alby; Claire Blache, Echirolles, both of France

[73] Assignee: The Torrington Company, Torrington, Conn.

[21] Appl. No.: 41,307

[22] Filed: Mar. 31, 1993

[30] Foreign Application Priority Data

Jun. 26, 1992 [FR] France ............................... 92 07872

[51] Int. Cl.⁶ ......................................................... G01L 3/00
[52] U.S. Cl. .............................. 73/862.321; 73/862.191; 324/207.2; 324/207.25
[58] Field of Search ....................... 73/862.331, 862.332, 73/862.08, 862.191, 862.28, 862.321, 862.325, 862.326, 862.328, 862.331, 862.332; 324/207.2, 207.25, 207.26

[56] References Cited

U.S. PATENT DOCUMENTS

| | | | |
|---|---|---|---|
| 3,191,434 | 6/1965 | Brunner et al. | 73/862.331 |
| 4,550,597 | 11/1985 | Drutchas et al. | 73/118 |
| 4,555,120 | 11/1985 | Frait et al. | 324/207.2 |
| 4,682,104 | 7/1987 | Lombard et al. | 73/862.331 |
| 4,850,722 | 7/1989 | Bayer . | |
| 4,946,296 | 8/1990 | Olschewski et al. . | |
| 4,948,277 | 8/1990 | Alff . | |
| 5,010,263 | 4/1991 | Murata | 324/207.2 |
| 5,157,329 | 10/1992 | Brauer | 324/207.25 |
| 5,159,268 | 10/1992 | Wu | 324/207.25 |

FOREIGN PATENT DOCUMENTS

| | | |
|---|---|---|
| 0371836 | 6/1990 | European Pat. Off. . |
| 0495323 | 7/1992 | European Pat. Off. . |
| 2574501 | 6/1986 | France . |
| 860242955 | 4/1988 | Japan . |
| 766098 | 3/1981 | U.S.S.R. . |

Primary Examiner—Richard Chilcot
Assistant Examiner—Ronald L. Biegel
Attorney, Agent, or Firm—John C. Bigler

[57] ABSTRACT

Two magnetic field generators are located symmetrically to each other in a first plane perpendicular to a shaft, and two magnetic field detectors are immobilized in a second plane perpendicular to the shaft. The magnetic field detectors provide a signal proportional to the torsional moment as a result of angular shift of the magnetic field generators with respect to the magnetic field detectors. The magnetic field generators have a magnetized structure with antiparallel magnetization directions and are supported by a first disk mounted on the shaft and are placed at the end of a first hub which surrounds the shaft. The first hub supports a bearing for mounting a second hub and second disk, which is axially shifted and to which the magnetic field detectors are rigidly attached.

8 Claims, 7 Drawing Sheets

TORSION MEASURING DEVICE FOR A ROTATING SHAFT

BACKGROUND OF THE INVENTION

The invention relates generally to a device for measuring torsional moment on a shaft and, more particularly, to a torsion measuring device in which magnetic field detection devices generate a signal indicative of torsional moment.

French Patent No. 2,626,368A describes a device in which the angular shift of two magnetic field generators placed respectively in two perpendicular cross sections of a shaft is detected by two sensors with an all-or-nothing signal output and in which the torsional moment is proportional to the magnetic phase shift of the induction fields detected respectively by the sensors.

French Patent No. 2,661,246A describes a device in which the angular shift of two magnetic field generators is detected by a sensor with a signal output proportional to the torsional moment of the rotating shaft.

When the magnetic field generators consist of multipolar magnets, the sensitivity of the measurement of the torsional moment of such measuring devices is limited by the minimum length of manufacturing for magnets. This measurement is difficult to implement when the torsional moment is low and the drive moment is high.

A torsion measuring device applied to a steering column shaft of a motor vehicle should satisfy the following requirements:

measurement range ±10 m.N;

sensitivity of the measurement ±0.1 m.N;

maximum moment to be transmitted 200 m.N;

maximum authorized angular shift between the input and the output of the measurement devices 4°; and output electrical signal ±2 V around the value of the signal with a moment of zero and for any value of the moment in the measurement range.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a torsion measuring device comprising two magnetic field generators located symmetrically with respect to each other in a first plane perpendicular to a shaft and two magnetic field detectors immobilized in a second plane perpendicular to the shaft. The magnetic field detectors provide a signal proportional to torsional moment as a result of relative angular shift of the magnetic field generators with respect to the magnetic field detectors. The magnetic field generators have a magnetized structure with opposing magnetization directions and are supported by a first disk mounted on a first hub surrounding the shaft. The first hub supports a bearing for mounting a second hub of a second disk which is axially shifted and to which the magnetic field detectors are rigidly attached.

The foregoing and other aspects of the invention will become apparent from the following detailed description when considered in conjunction with the accompanying drawing figures.

BRIEF DESCRIPTION OF THE DRAWING FIGURES

DETAILED DESCRIPTION

Figure 1:
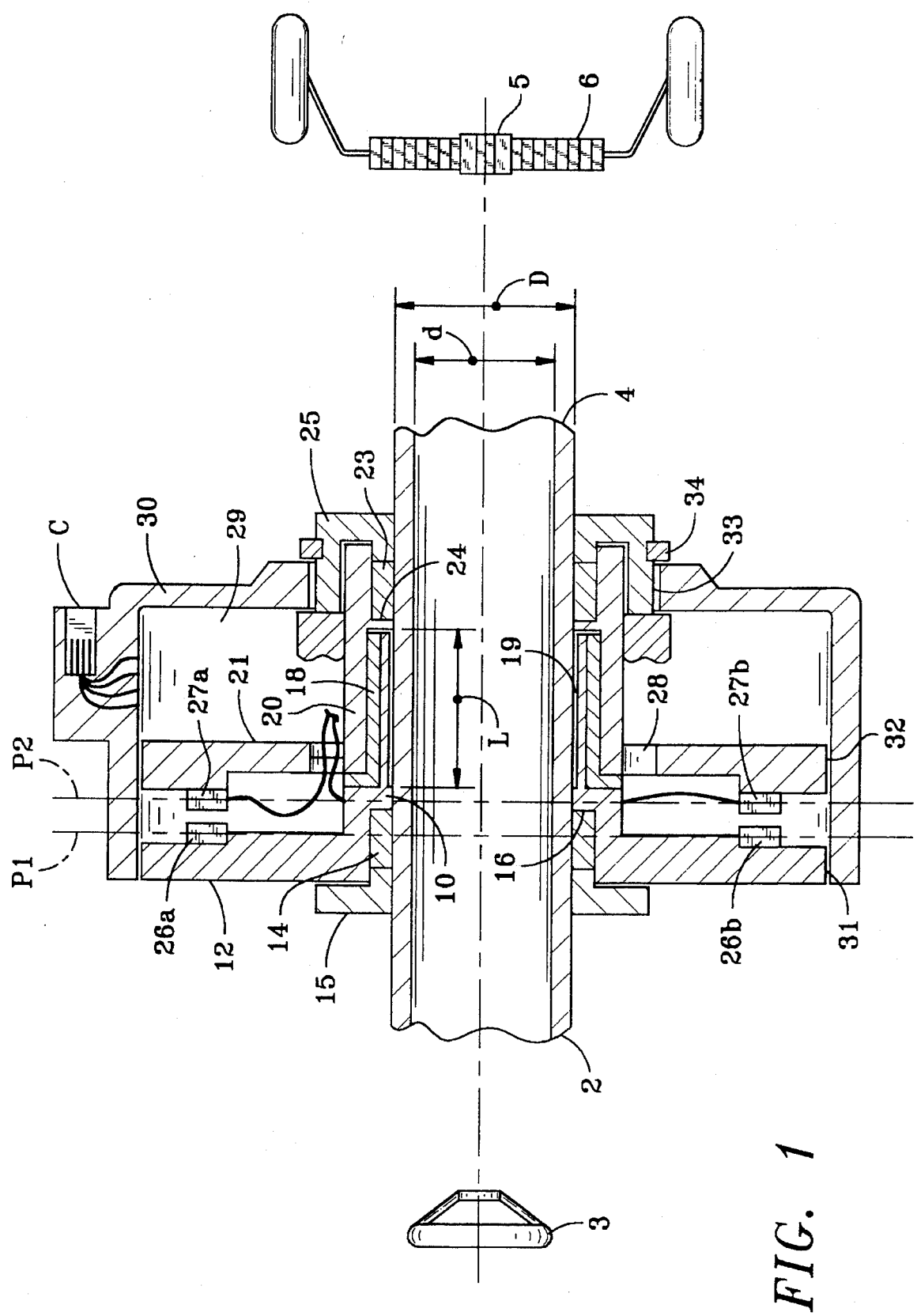
FIG. 1 is a longitudinal sectional view of an embodiment of the present invention as mounted on a rotating shaft.

Referring now to the drawings, FIG. 1 illustrates a rotating tubular steering column shaft having internal diameter d and external diameter D. The shaft is connected by its extremity 2 to motor vehicle steering wheel 3 and by its extremity 4 to receiving pinion 5 for the control of steering rack system 6, represented schematically. The shaft is surrounded by tubular hub 10, of which one extremity supports first disk 12 which is subsequently referred to below as "coder disk".

Hub 10 and coder disk 12 are preferably made of a soft ferromagnetic material or of a soft steel. Hub 10 and coder disk 12 include recess 13 for mounting expandable fixture 14 in contact with the shaft and recess 13 as a result of compression force communicated by collar 15 screwed onto coder disk 12. Fixture 14 is immobilized axially in contact with shoulder 16 of recess 13 and ensures the blocking of coder disk 12 and hub 10 in contact with the shaft as a result of compression force applied by collar 15.

Hub 10 is mounted on the shaft with clearance 19 and supports bearing 18 for mounting of hub 20 of second disk 21 axially shifted on the shaft with respect to coder disk 12. Disk 21 is referred to below as "sensor disk". Hub 20 and sensor disk 21 are preferably made of a soft ferromagnetic material or a soft steel and are immobilized in contact with the shaft as has been explained for hub 10 and coder disk 12 by expandable fixture 23 which is tightened in contact with shoulder 24 by collar 25.

Coder disk 12 supports two magnetic field generators 26a and 26b which are located diametrically opposite and symmetrically to each other in plane P1 of a perpendicular cross section of the shaft. In a similar manner, sensor disk 21 supports magnetic field detectors consisting of Hall effect sensors 27a and 27b located symmetrically with respect to each other in plane P2 of a perpendicular cross section through the shaft. Sensor disk 21 also has perforation 28 for the passage of a cable for electrical connection to signal conversion devices located in housing 29.

Housing 29 is delimited by hub 20, sensor disk 21, and casing box 30. Casing box 30 supports connector C for external connection of the device. Casing box 30, which is immobilized axially by ring 34 supported by coupling 25, is mounted so it can rotate freely on bearing surfaces 31, 32, 33 respectively located on the periphery of disks 12, 21 and of coupling 25.

The device operates as follows. The shaft ensures the transfer of the rotational movement of steering wheel 3 to pinion 5. When pinion 5 opposes a resistance to rotation of steering shaft 3, the shaft undergoes a torsional deformation. The sections of the shaft which support respectively the elements 13, 15, 16 and 23, 25, 24 undergo a relative displacement which causes a relative angular displacement of disks 12 and 21.

The extent of the relative angular displacement of disks 12 and 21 depends particularly on the length of section L of the shaft located between shoulders 16 and 24. Following the angular immobilization of casing box 30, the device is capable of angular displacement in the casing box 30 at the level of bearing surfaces 31, 32, 33.

Figure 2:
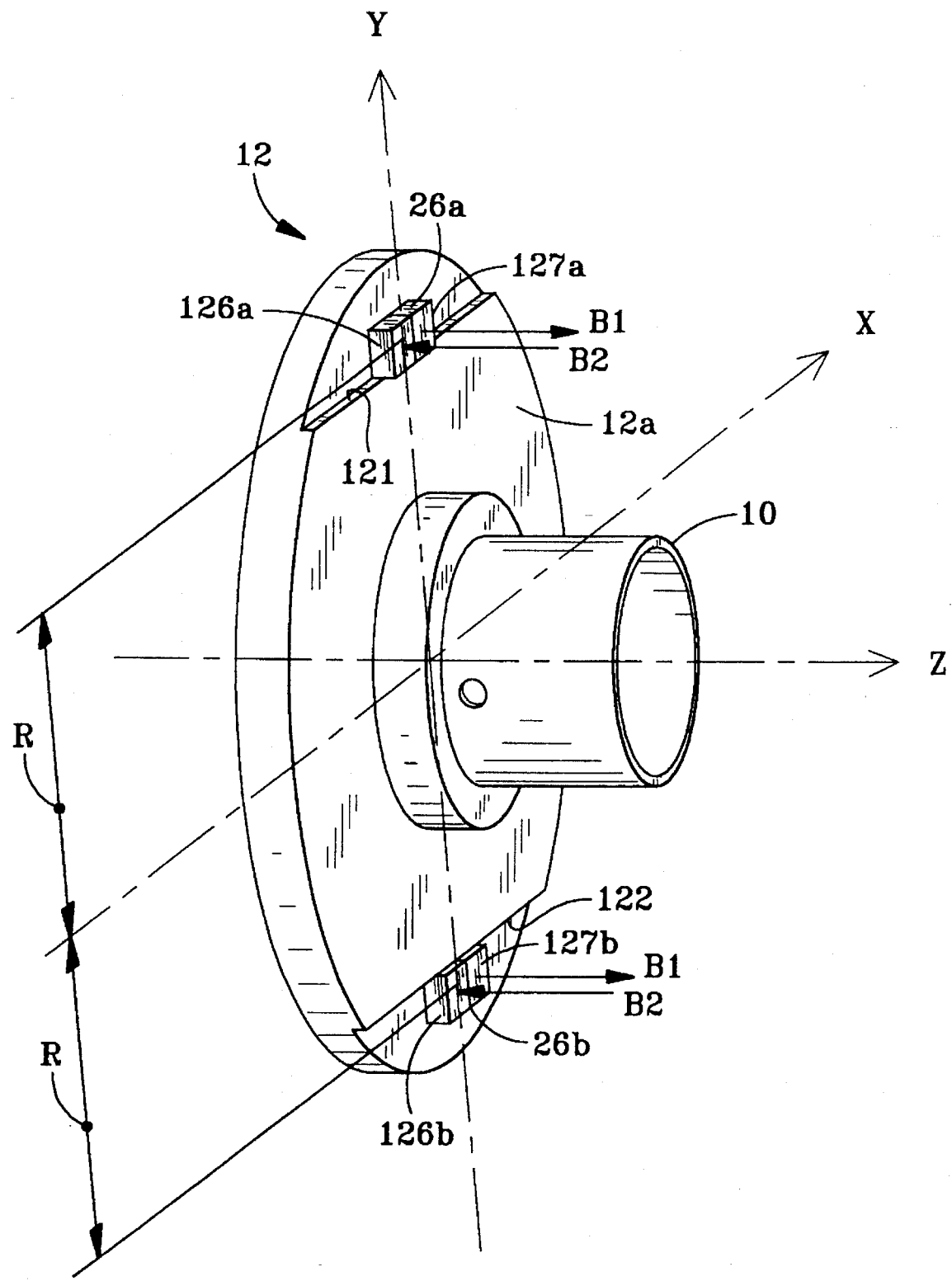
FIG. 2 is a perspective view of the magnetic field generator of FIG. 1.

According to FIG. 2, side 12a of coder disk 12 supports two linear guidance shoulders 121 and 122 which are parallel to each other and equidistant with respect to rotational axis OZ. Shoulders 121 and 122 respectively support magnetic field generators 26a and 26b. Magnetic field generators 26a and 26b are held along the direction of axis OY by their respective supports on shoulders 121 and 122 at distance R from plane XOZ.

The latitude of displacement of field generators 26a and 26b along shoulders 121 and 122 permits regulation of the latter's position along axis OX, prior to their definitive immobilizations, using a system of orthogonal axes OX, OY and OZ. Magnetic field generator 26a consists of two parallelepiped magnets 126a and 127a which are placed end to end. The direction of magnetization of each magnet 126a, 127a is perpendicular to its supporting side on coder disk 12.

In contrast, magnetic field vector B1 generated by magnet 127a is in the direction of positive Z values while magnetic field vector B2, generated by magnet 126a, is in the direction of negative Z values. This arrangement makes it possible to obtain in proximity to the abutment of magnets 126a and 127a a strong magnetic field gradient for a displacement in the direction of axis OX.

Similarly, field generator 26b consists of two parallelepiped magnets 126b and 127b placed end to end. Magnetic field vector B1 generated by magnet 127b is directed in the direction of positive Z values. Magnetic field vector B2 generated by magnet 126b is directed in the direction of negative Z values.

According to a characteristic of coder disk 12, the abutments of magnets 126a and 127a and of magnets 126b and 127b are located in plane YOZ. Magnetic field vectors B1 and B2 produced by magnetic generator 26a are symmetrical, with respect to the plane XOZ, to magnetic field vectors B1 and B2 delivered by the magnetic field generator 26b.

Figure 3:
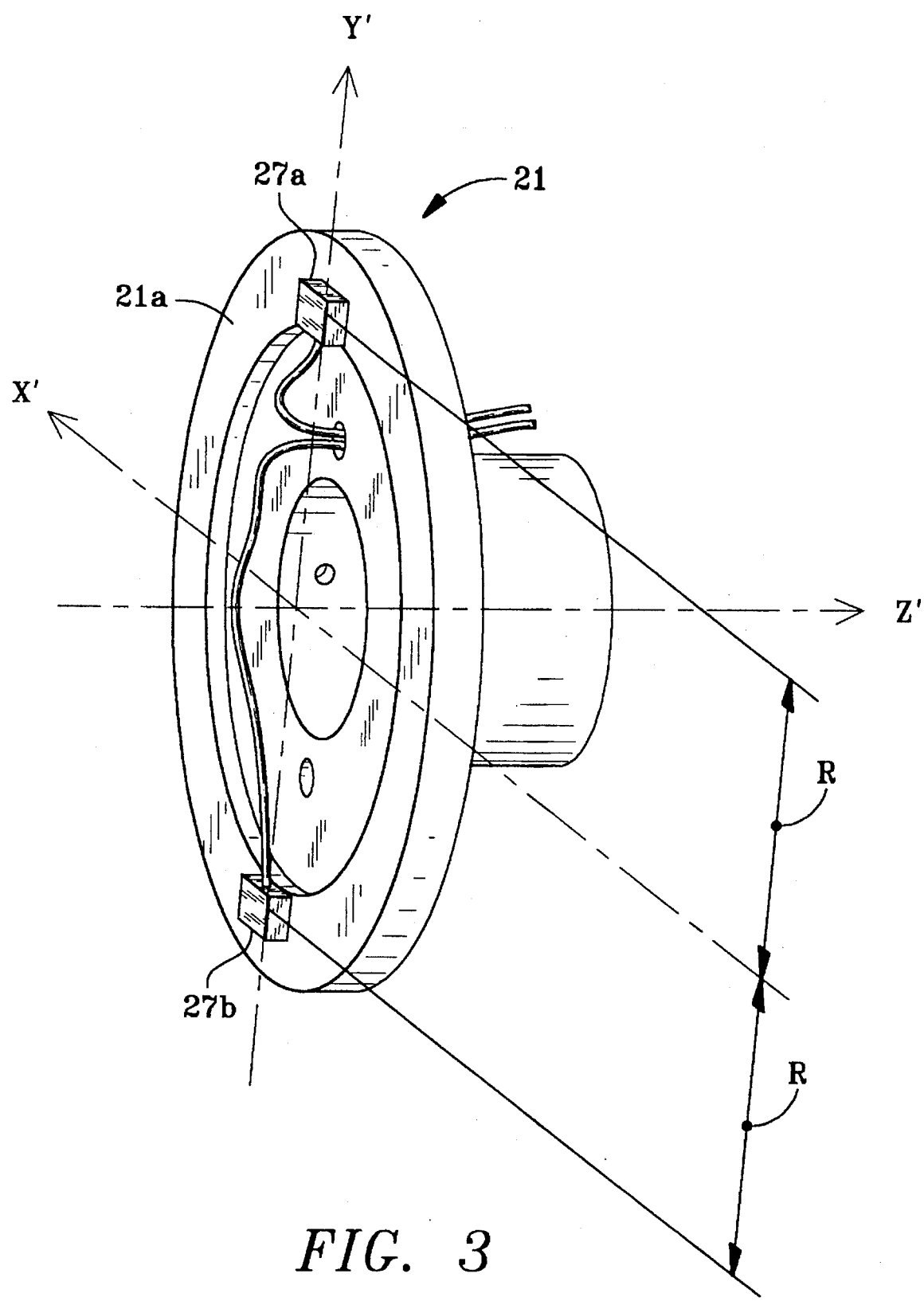
FIG. 3 is a perspective view of the magnetic field detector of FIG. 1.

According to FIG. 3, side 21a of sensor disk 21 supports Hall-effect magnetic field detectors 27a and 27b which are attached so that their centers are symmetrical in a diametrical plane defined by axes OY' and OZ' at distance R from center O. Conventionally, R is called the "reading radius". With reference to FIGS. 1 and 3, the device is set in position with zero torsion by causing planes OY, OZ and OY', OZ' to overlap, before the definitive tightening of elements 13, 15, 16 and 23, 25, 24.

Figure 4:
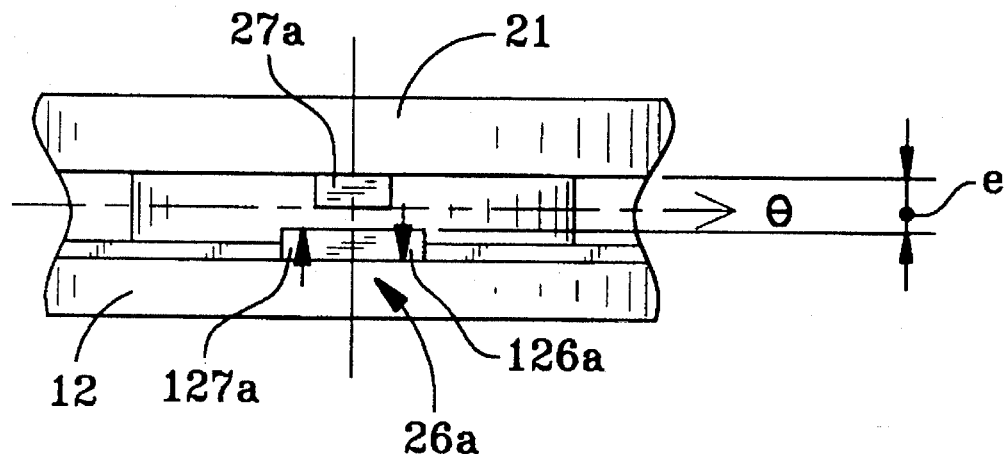
FIG. 4 is a partial view of the mounted torsion measuring device of FIG. 1.

FIG. 4 is a partial view of the mounted torsion measuring device and shows air gap e between magnetic elements 126a and 127a and sensor disk 21, which supports detector 27a.

Figure 5:
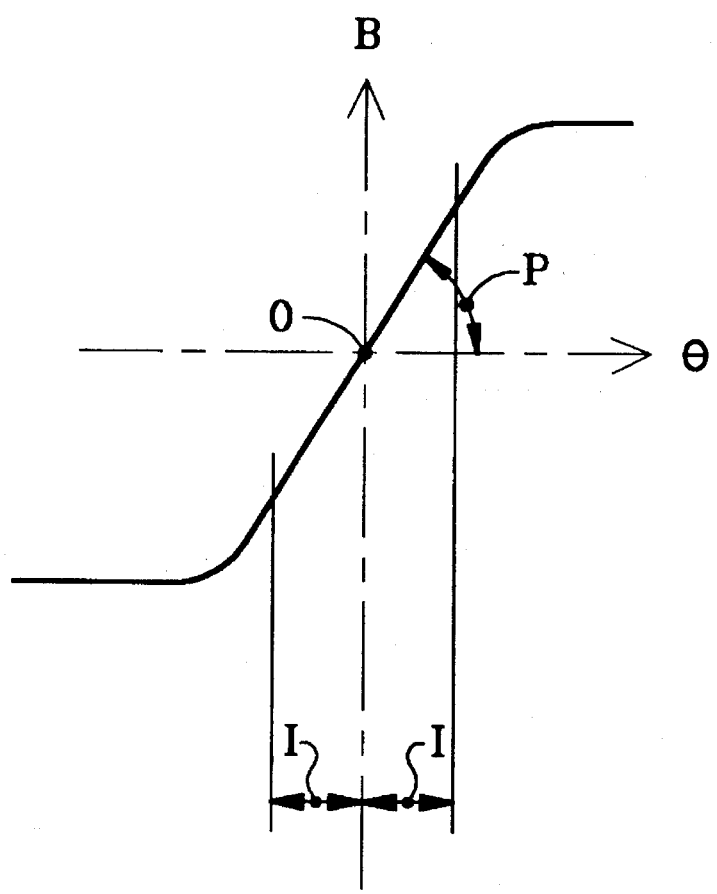
FIG. 5 illustrates a characteristic curve of magnetic field variation in the separation interval between the magnetic field generator and the magnetic field detector of the torsion measuring device of FIG. 1.

FIG. 5 illustrates the variation in magnetic induction B recorded by detector 27a if disk 21 moves in direction θ. Magnets 126a and 127a are preferably of the neodymium-iron-boron or samarium-cobalt type whose residual magnetic field is between 1 and 1.25 Tesla.

The thicknesses of disks 12 and 21 are selected so that the constitutive materials do not reach the magnetic saturation value. Under these conditions, according to FIG. 5, magnetic field B which passes through air gap e presents in the zone close to the abutment of elements 127a or 126b, 127b and along a direction θ parallel to sides 12a and 21a of disks 12 and 21, a linear variation with a slope P of approximately 0.4 mT per μm over a distance 2I of 0.8 mm.

If axis OY' of detector 27a has zero torque in the plane of abutment of magnets 126a and 127a, the application of torque to the device is reflected in a displacement along direction θ of detector 27a with respect to the abutment of elements 126a and 127a. This displacement is converted by said detector into electrical voltage Vs proportional to the magnetic field through which it passes, in a linear relation with the value of the displacement over the entire interval 2I.

With a torsional moment of zero, the output signals Vsa and Vsb respectively produced by detectors 27a and 27b are equal to Vo. The torsional moment is reflected, for example, in an angular rotation of disk 21 with respect to disk 12 and in a relative displacement of detectors 27a and 27b with respect to field generators 26a and 26b and causes a variation in positive output signal Vsa and in the negative output signal Vsb.

Figure 6:
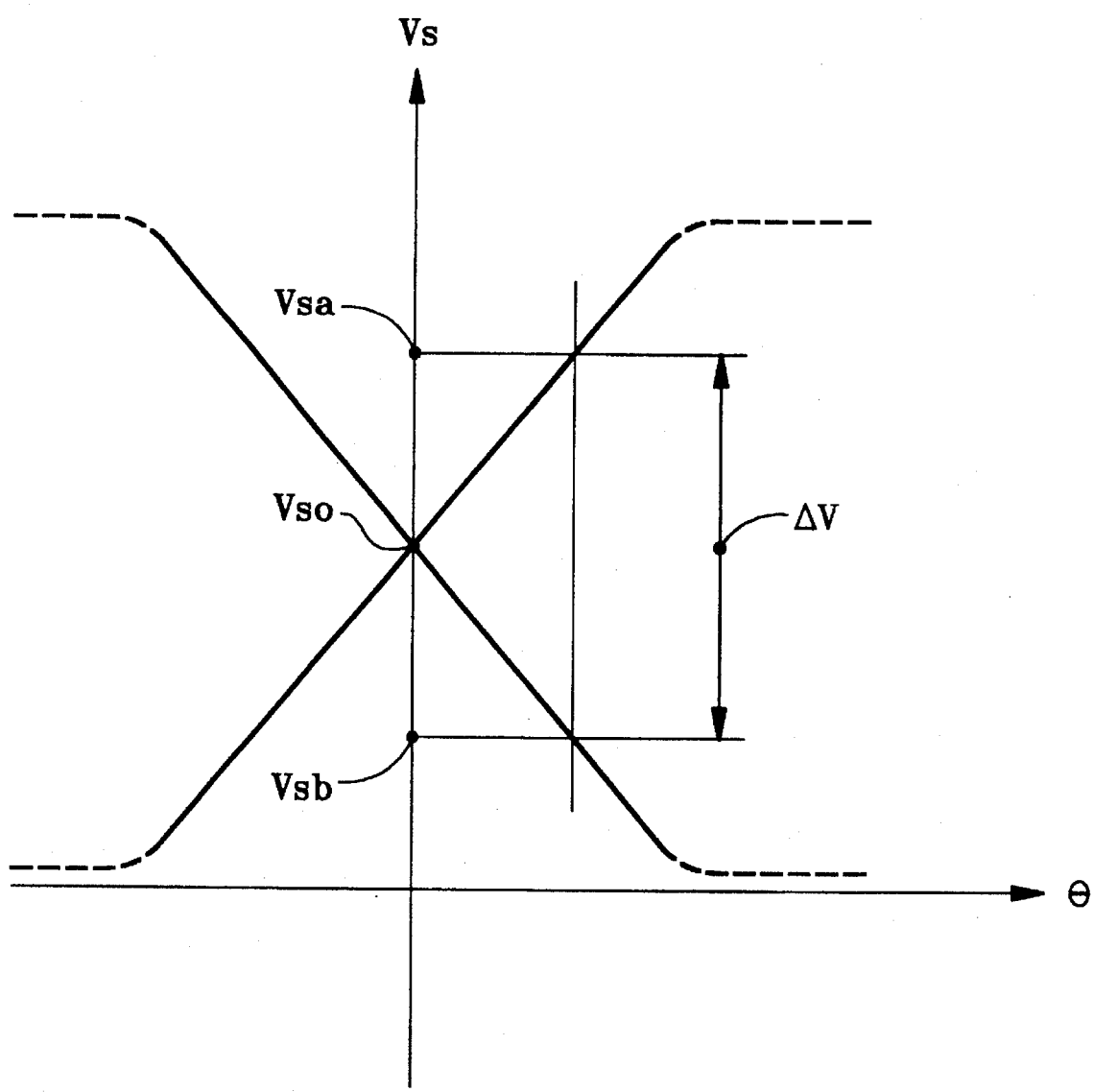
FIG. 6 is a representation of the electrical output signal of the torsion measuring device of FIG. 1.

According to FIG. 6, the absolute value of the difference between the two output signals (ΔV=Vsa−Vsb) represents the value of the torsional moment applied to the shaft, and the sign of the difference indicates the direction of application of torque. This disposition of generators 26a and 26b is not sensitive to measurement errors caused by a bending component applied to the shaft in any of the planes passing through the axis OZ.

Figure 7:
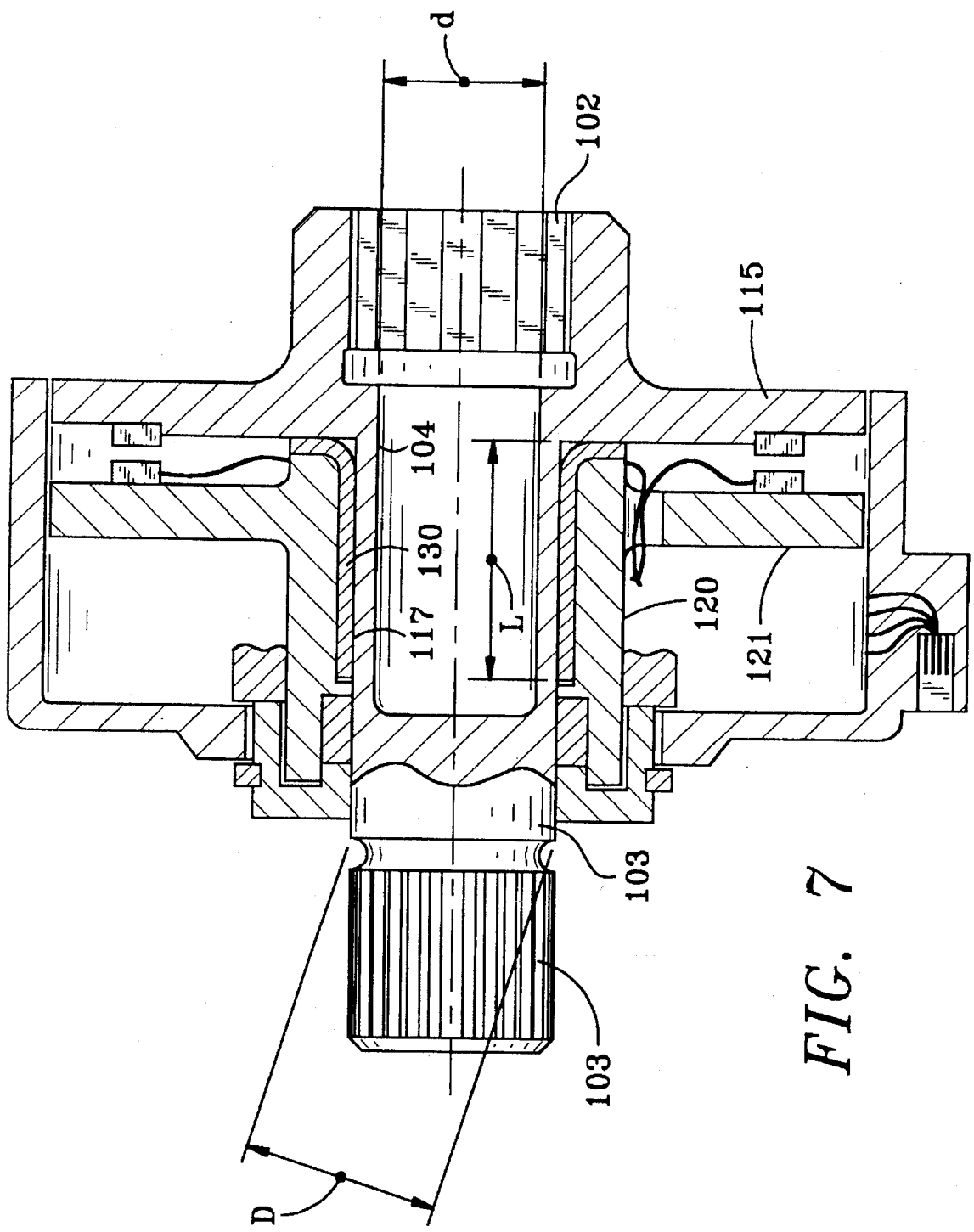
FIG. 7 is a longitudinal sectional view of a second embodiment of the present invention.

FIG. 7 illustrates a second embodiment in which the shaft is replaced by shaft 100 which supports at one extremity grooved cavity 102 which permits a connection without clearance with a motor device. Shaft 100 possesses at the other end grooved bearing surface 103 permitting a connection without play to a receiving device. The bottom of cavity 102 is located in the radial plane of coder disk 115 whose hub constitutes shaft 100.

Cylindrical bearing surface 117 with diameter D of shaft 100 extends axially between coder disk 115 and grooved bearing surface 103 and supports bearing 130. Annular hub ring 120 is mounted concentrically outside shaft 100 and abuts axially against bearing 130. The extremity of hub ring 120 is turned toward coder disk 115 and supports sensor disk 121. Coder disk 115 is arranged identically to coder disk 12 of FIG. 1, and sensor disk 121 is arranged identically to sensor disk 21.

The other end of hub ring 120 supports a means for local immobilization consisting of a deformable body pressed against a shoulder through a screwed collar as described with reference to FIG. 1. This local immobilization means, located at axial length L from coder disk 115, acts on bearing surface 117 in proximity to grooved bearing surface 103. Shaft 100 also has recessed hole 104 with diameter d which extends axially from the bottom of grooved cavity 102 essentially to the plane of immobilization of ring 120.

Figure 8:
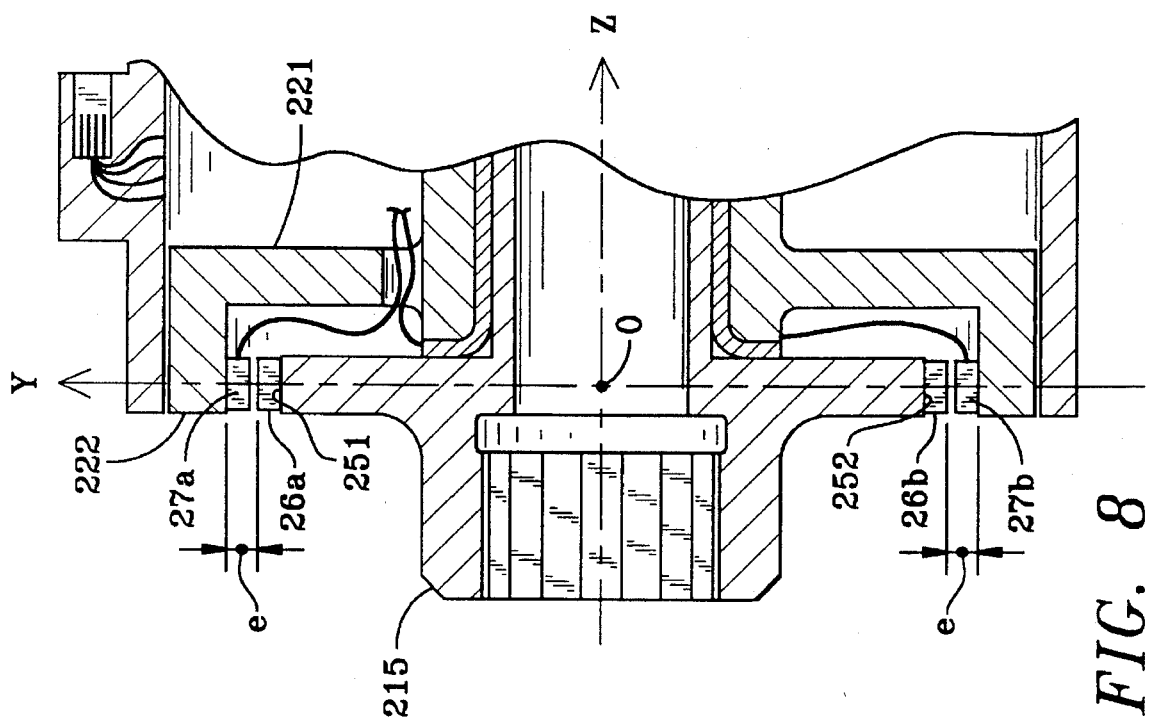
FIG. 8 is a partial cross sectional view of a third embodiment of the present invention.

FIG. 8 illustrates an arrangement of magnetic field generators 26a and 26b which are respectively attached to two parallel plane surfaces 251 and 252 provided on the external diameter of coder disk 215 at equal distance from axis OZ. Detection means 27a and 27b are attached to axial extension 222 of sensor disk 221. Coder disk 215 and sensor disk 221 preferably consist of a soft steel or a soft ferromagnetic material. Two field generators 26a and 26b are located along axis OY.

Figure 9:
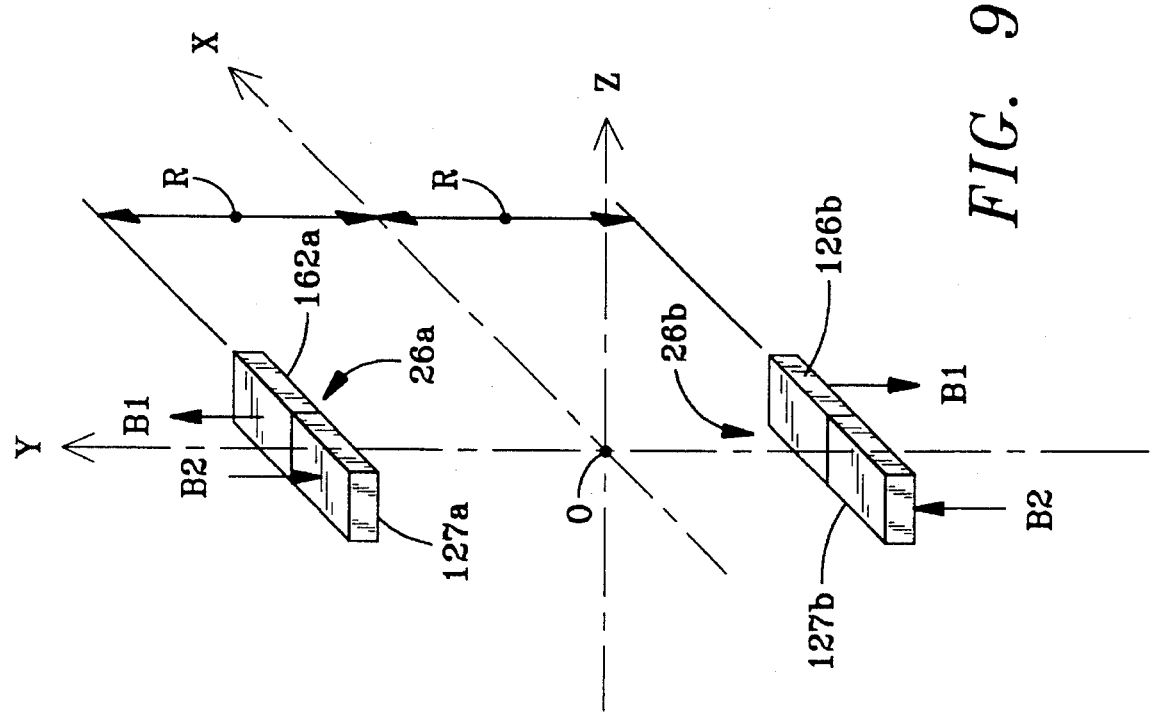
FIG. 9 is a diagrammatic representation of the magnetic field generator of the torsion measuring device of FIG. 8.

FIG. 9 is a perspective view of the position of magnetic elements 26a and 26b with respect to axes OX, OY and OZ. Magnetic element 26a consists of two parallelepiped magnets 126a and 127a placed end to end. Their directions of magnetization are perpendicular to their sides of support on coder disk 215. Magnetic field vector B1 generated by magnet 126a is directed in the positive direction of axis OY while magnetic field vector B2 generated by magnet 127a is directed in the negative direction of axis OY.

Similarly, magnetic element 26b consists of two parallelepiped magnets 126b and 127b placed end to end. Magnetic field vector B1 generated by magnetic field 126b is directed in the negative direction of axis OY while magnetic field vector B2 generated by magnet 127b is directed in the positive direction of axis OY. Coder disk 215 promotes abutment of magnets 126a and 127a as well as that of magnets 126b and 127b in a plane defined by axes OY and OZ.

Magnetic field vectors B1 and B2 produced by magnetic element 26a are symmetrical, with respect to the plane defined by axes OZ and OX, to magnetic field vectors B1 and B2 delivered by magnetic element 26b. The free sides of magnetic elements 26a and 26b are a distance R from plane XOZ. The centers of detection means 27a and 27b attached on axial extension 222 of disk 221 are in plane YOZ of the abutments of magnets 126a, 127a and 126b, 127b and are separated from magnetic elements 26a and 26b by air gap e as defined above.

The present invention measures torsional moment by measuring torsional microdisplacements of two sections of a shaft with high rigidity and which offer resistance to high torsional moments without being torque limiting. Two magnetic field generators are located in the plane of a perpendicular cross section of the shaft, and two magnetic field detectors are immobilized in the plane of a perpendicular cross section of the shaft. The magnetic field detectors generate a signal proportional to the torsional moment as a result of the relative angular shift of the field generators with respect to the field detectors.

The device of the present invention can be mounted directly on a rotating shaft and requires no local reduction of rigidity of the shaft to increase the sensitivity of the device. Consequently, the shaft can support the entire control moment without any additional means for limiting the deformation due to torsion.

The present invention relates to a device for measuring a moment on a blocked shaft, or on a shaft with varying speed of rotation. The invention provides a simple and economical device for measuring a moment on a motor vehicle steering shaft which can be mounted regardless of the position of said shaft. The torsional rigidity of the device is at least equal to the torsional rigidity of the weakest section of an unassisted steering column with manual control.

Having described the invention, what is claimed is:

1. A device for measuring torsion on a shaft comprising:
   two magnetic field generators, immobilized with respect to a first portion of the shaft, located symmetrically with respect to each other in a first plane perpendicular to the shaft; and two magnetic field detectors, immobilized with respect to a second portion of the shaft axially spaced from the first portion, the magnetic field detectors being located in a second plane perpendicular to the shaft, the magnetic field detectors providing separate signals that are combined to provide a signal proportional to torsional moment as a result of relative angular shift of the magnetic field generators with respect to the magnetic field detectors, wherein the signal proportional to torsional moment results from subtracting an output signal of one magnetic field detector from an output signal of the other magnetic field detector.

2. The torsion measuring device according to claim 1, wherein the shaft is directly connected to a drive means and a receiving device and wherein the shaft extends axially from the drive means through the torsion measuring device to the receiving device.

3. A device for measuring torsion on a shaft comprising:
   two magnetic field generators, immobilized with respect to a first portion of the shaft, located symmetrically with respect to each other in a first plane perpendicular to the shaft; and two magnetic field detectors, immobilized with respect to a second portion of the shaft axially spaced from the first portion, the magnetic field detectors being located in a second plane perpendicular to the shaft, the magnetic field detectors providing separate signals that are combined to provide a signal proportional to torsional moment as a result of relative angular shift of the magnetic field generators with respect to the magnetic field detectors, wherein the magnetic field generators have a magnetized structure with opposing magnetization directions and are supported by a first disk mounted on a first hub surrounding the shaft, the first hub supporting a bearing for mounting a second hub of a second disk which is axially shifted and to which the magnetic field detectors are rigidly attached.

4. The torsion measuring device according to claim 3, wherein each magnetic field generator consists of two parallelepiped magnets which are in contact along one of their lateral sides and which have, respectively, one side of support on the first disk and respective magnetic field vectors B1 and B2 with opposite direction perpendicular to said support side and wherein the contacting sides of the magnets are located in a first diametrical longitudinal plane and wherein the magnetic field vectors of the magnetic field generators are located symmetrically with respect to a second diametrical longitudinal plane perpendicular to said first diametrical longitudinal plane.

5. The torsion measuring device according to claim 4, wherein the support sides of the magnets of the magnetic field generator are located in the plane of the first disk.

6. The torsion measuring device according to claim 4, wherein the support sides of the magnets of the magnetic field generator are located on the periphery of the first disk.

7. The torsion measuring device according to claim 4, wherein the shaft is directly connected to a drive means and a receiving device and wherein the shaft extends axially from the drive means through the torsion measuring device to the receiving device.

8. The torsion measuring device according to claim 3, wherein the shaft is directly connected to a drive means and a receiving device and wherein the shaft extends axially from the drive means between lateral sides of the torsion measuring device to the receiving device.

\* \* \* \* \*